United States Patent Office 3,690,820
Patented Sept. 12, 1972

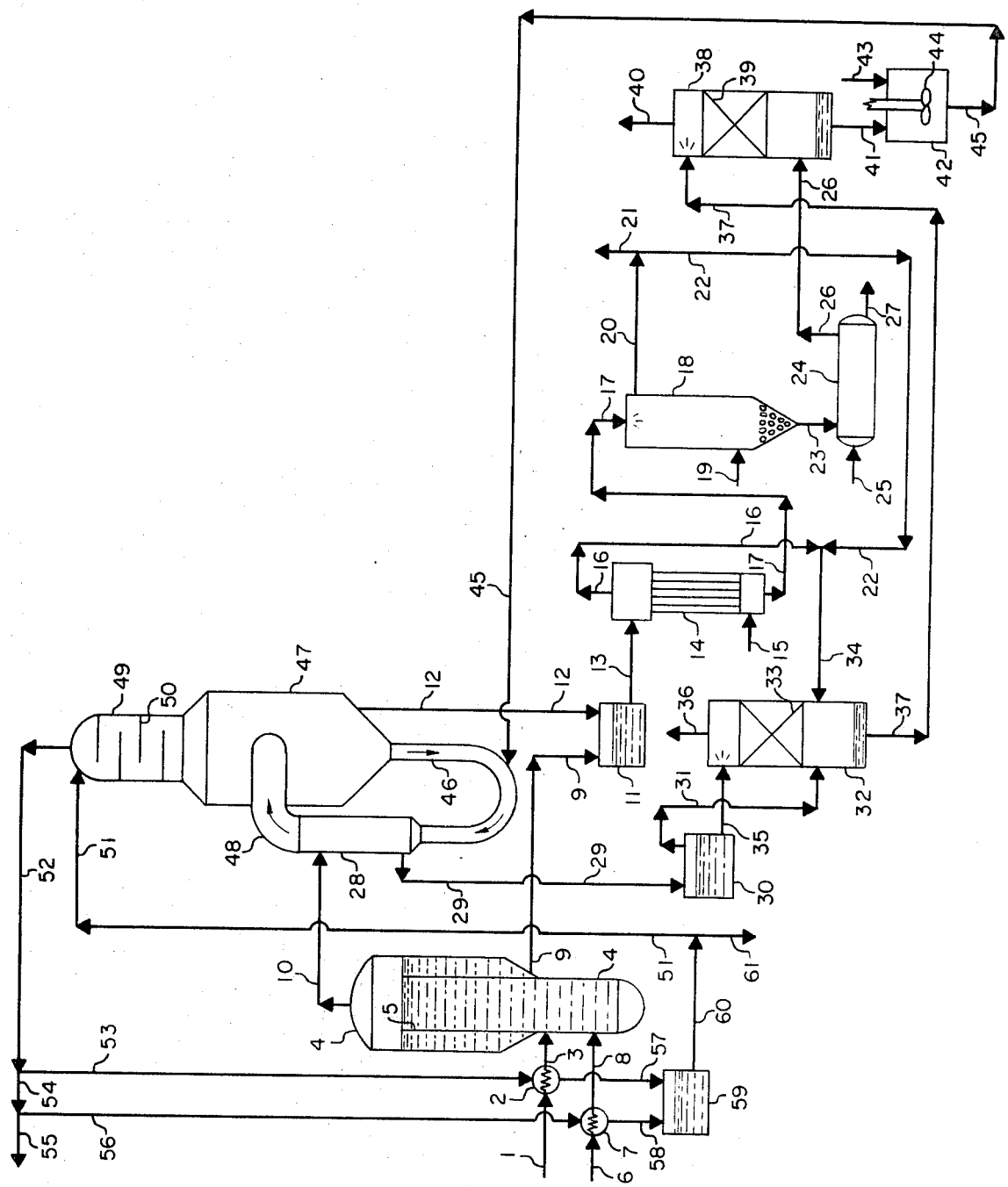

---

3,690,820
PRODUCTION OF AMMONIUM NITRATE
Daniel J. Newman, Jackson Heights, N.Y., and Rolf Falck-Muus, Closter, N.J., assignors to Chemical Construction Corporation, New York, N.Y.
Filed June 13, 1969, Ser. No. 832,932
Int. Cl. C01c 1/18
U.S. Cl. 423—396                 6 Claims

ABSTRACT OF THE DISCLOSURE

An improvement in the production of solid chemicals such as ammonium nitrate is provided, for processes in which a vapor containing liquid droplets is evolved during formation or concentration of a liquid solution containing dissolved solid chemical. The vapor is cooled and condensed, and the resulting liquid condensate is employed to scrub a gas stream laden with entrained solid or liquid chemical particles, which is formed during processing of the liquid solution with gas to form solid chemical. The scrubbing step produces liquid solution containing dissolved solid chemical which is economically concentrated and recycled.

BACKGROUND OF THE INVENTION

Field of the invention

The invention relates to the production of solid particulate ammonium nitrate or other solid particulate chemicals which are produced from a liquid solution by evolution of vapor, followed by the processing of the concentrated solution, melt, or solid chemical particles with the aid of a gas such as air, which produces an off-gas containing entrained particles of the chemical.

Description of the prior art

In most prior art processes for the production of solid nitrates, sulfates, urea or the like, any vaporous or gaseous streams containing minor proportions of entrained liquid droplets or product chemical in other forms may be cooled, usually by indirect heat exchange, followed by discharge of the resulting liquid condensate to a body of water such as a stream or lake, with resultant water pollution. Off-gas streams such as process air or tail gas streams containing entrained solid particles in a minor proportion are usually discharged to the atmosphere, with resultant air pollution. In addition to water and/or air pollution, potentially valuable amounts of product or byproduct chemicals may be lost or wasted.

One system for recovering by-product off-gas from a urea synthesis process is described in U.S. Pat. No. 3,038,-285. This procedure is also applicable to the final vapors evolved during evaporative concentration of the urea solution. Another recovery procedure in urea synthesis is described in U.S. Pat. No. 3,354,205. An ammonium nitrate production process is described in U.S. Pat. No. 3,285,695.

In many prior art processes, such as the production of nitric acid, the final tail gas stream produced by the process and containing minor proportions of valuable chemicals is treated to destroy, or render innocuous, the residual proportions of chemicals, so as to prevent pollution. Nitric acid tail gas treatment processes of this nature are described in U.S. patent application No. 409,507 filed Nov. 6, 1964 and now issued as U.S. Pat. No. 3,467,492, and U.S. patent application No. 555,108 filed June 3, 1966 and now issued as U.S. Pat. No. 3,443,910.

SUMMARY OF THE INVENTION

Many chemical plant processes involve production of a water solution of the product followed by evaporation of the water and final drying of the solid product with air. Heretofore such plants have presented two major sources of pollution. One source is the overhead vapor from the evaporation stages, or the vapors from the reactor if the reaction is exothermic, which contains droplets of solution as carryover. Another source is the air leaving the dryers, which is normally scrubbed with a fairly concentrated solution of the product and will therefore also carry out some droplets of such solution.

For example, in an ammonium nitrate plant, the steam leaving the neutralizer as overhead may contain 0.5% ammonium nitrate by weight. Part of the overhead is normally condensed in an exchanger to supply process heat and is then discharged from the plant as a liquid effluent, with the 5000 p.p.m. of nitrate present causing serious stream pollution. Similarly, to minimize dilution of the product the air leaving the dryers is normally scrubbed with a high concentration of about 50% to 60% by weight nitrate solution, with the latter solution being returned to process without excessively diluting the system. The air leaving the scrubbers may contain, for example, 100 p.p.m. of ammonium nitrate, which can be an excessive air pollutant.

In the present invention, the improvement encompasses, with respect to an ammonium nitrate plant as an example, the use of all the neutralizer condensate contaminated with ammonium nitrate to scrub the dryer air. If a separate scrubber is provided after the scrubber described above, the absorbing fluid will have a concentration of about 1% so that the air discharged will contain about 2 p.p.m. of ammonium nitrate rather than 100 p.p.m. If all the condensate is used directly in a single scrubber, concentrations may reach 5 to 6% and the effluent air will contain about 10 p.p.m. of ammonium nitrate.

The overflow condensate leaving the scrubbing system either flows to a remelt system where oversize and undersize product is redissolved, or flows directly to a vacuum stripping column, except for the small amount required for redissolving. For the latter case, much of the water present in 5–6% solution can be evaporated in an exchanger using very low pressure steam from the neutralizer, with only a slight vacuum on the water. The bottoms at perhaps 20% concentration could be concentrated to, for example, 80% solution using higher pressure steam either before or after mixing with the redissolved nitrate stream. The overhead vapor enters a stripping tower consisting of several trays or several feet of packing, where the vapor is contacted by a countercurrent stream of substantially pure condensate reflux. The overhead from the stripping column is steam of any desired purity obtained by adjusting the number of stages and reflux provided. This pure steam is condensed in process heaters to recover its heat. The pure condensate could be used for process or boiler feed water.

For the alternate system, where all condensate from the scrubbing system is sent to the remelt system, a final concentration of about 20% by weight aqueous ammonium nitrate solution may result. The water is boiled out using medium pressure steam which could be provided from the neutralizer overhead vapors when this unit is operated under pressure, and/or high vacuum.

In a commercial facility where aqueous ammonium nitrate solution is concentrated to a substantially anhydrous melt which is prilled, all or part of the prill tower air is brought to ground level by centrifugal fans and scrubbed before being discharged to atmosphere. This scrubbing system will also handle the water vapor-air mixture from the air swept falling film evaporator. The total condensate from the neutralizer overhead is used as scrubbing medium.

The air from the product drying drum or drums is scrubbed in separate scrubbers using the liquid effluent from the tower air scrubber as scrubbing medium. This will result in a 6% to 7% ammonium nitrate solution and an air effluent containing less than about 13 kg. per day of total ammonium nitrate discharge for a 53,000 kg./hr. plant. The weak ammonium nitrate solution is used in the remelt tank.

The 20% to 25% ammonium nitrate solution from the remelt tank is concentrated to 83% in a vacuum concentrator. The water vapor from the concentrator is stripped of any entrained ammonium nitrate in a sieve tray column located on top of the concentrator vapor drum. The vacuum vapor is used for heating nitric acid and evaporating and superheating the ammonia used in the neutralizer, with the remainder of the water vapor being condensed in a surface condenser. Part of the condensate is used as reflux for the stripping column. For steam economy, a pressure neutralizer is used so that the neutralizer overhead can be used in the remelt concentrator heater. Any ammonia in this condensate is disposed of in the tower air scrubber.

The principal advantage of the present invention relates to chemical plant pollution abatement, and the prevention of air and/or water pollution previously caused by the discharge of waste liquid or gaseous streams containing noxious components. Another advantage is that valuable proportions and amounts of chemicals may be recovered. Another advantage is that overhead vapors from a chemical reactor or evaporator, such as the overhead from a neutralizer in an ammonium nitrate plant, is utilized in an efficient and improved manner, which permits recycle of the liquid condensate derived from cooling of the neutralizer overhead vapors, while recovering the heat therefrom.

It is an object of the present invention to provide an improved procedure for the abatement and prevention of pollution in the operation of chemical plants.

Another object is to recover previously wasted chemical components in process streams discharged from a chemical plant.

An additional object is to provide an improved ammonium nitrate process sequence.

A further object is to utilize overhead vapors discharged from a chemical process to recover entrained components from a waste gas stream in a chemical process.

These and other objects and advantages of the present invention will become evident from the description which follows:

DESCRIPTION OF THE DRAWING AND PREFERRED EMBODIMENTS

Referring now to the drawing, a flowsheet of a preferred embodiment of the invention as applied to an ammonium nitrate production facility is presented. Liquid or gaseous ammonia stream 1 is passed to heat exchanger 2, and is preferably at an elevated pressure in the range of 2 kg./sq. cm. to 10 kg./sq. cm. The ammonia stream 1 is heated in unit 2 to an elevated temperature generally in the range of about 50° C. to 150° C., and when stream 1 is in the liquid state, a partial or total vaporization of stream 1 may take place in unit 2. The resulting heated ammonia stream 3 is passed into neutralizer vessel 4, which is preferably a generally vertically oriented cylindrical vessel. Circulation or agitation means, not shown, may be provided within unit 4. An aqueous nitric acid stream 6, which is of any suitable acid strength generally in the range of about 40% to about 70% free acid content by weight, is heated in heat exchanger 7 to an elevated temperature generally in the range of about 50° C. to 100° C. The resulting heated aqueous nitric acid stream 8 is passed into unit 4, preferably at an elevated pressure in the range of 2 kg./sq. cm. to 10 kg./sq. cm., and reacts with ammonia stream 3 within the lower portion of unit 4 to form aqueous amonium nitrate solution and evolve steam due to the elevated temperature generated by the exothermic reaction. The resulting concentrated aqueous ammonium nitrate solution is removed from unit 4 at an elevated temperature generally in the range of 100° C. to 150° C. via stream 9, which will generally contain in the range of about 70% to 90% ammonium nitrate content by weight, balance water. A vapor stream 10 is also removed from the upper portion of unit 4. Stream 10 consists primarily of steam, typically at an elevated pressure in the range of 2 kg./sq. cm. to 10 kg./sq. cm., and stream 10 also contains a minor proportion of ammonia and entrained liquid droplets of ammonium nitrate solution. Stream 10 is further processed in accordance with the present invention, as will appear infra.

Stream 9 is passed into hold tank 11, together with recycle concentrated ammonium nitrate solution stream 12, which is derived in accordance with the present invention as will appear infra. The resulting combined aqueous ammonium nitrate solution stream 13 is passed from tank 11 into the upper liquid distribution section of the falling film evaporator 14, which is a preferred apparatus for concentrating the solution to produce a substantially anhydrous ammonium nitrate melt. The feed liquid solution stream 13 is distributed on the inner surfaces of the vertically oriented and externally heated tubes of unit 14, and the liquid flows downwards through the tubes in the form of a thin falling liquid film, countercurrent to an air sweep stream 15, which is admitted into the lower end of unit 14 and rises through the tubes countercurrent to the downflowing heated liquid films. The resulting air stream 16 removed from the upper end of unit 14 at a temperature typically in the range of 100° C. to 200° C. is now laden with water vapor and a small proportion of entrained liquid droplets containing ammonium nitrate. Stream 16 is further processed in accordance with the present invention, as will appear infra.

A substantially anhydrous ammonium nitrate melt stream 17 is removed from the bottom of unit 14, and is now solidified into discrete particles, typically by prilling or granulating, to produce solid ammonium nitrate product. Stream 17 is sprayed or otherwise dispersed into the upper end of prill tower 18, and the liquid melt droplets fall downwards through unit 18 countercurrent to a rising stream of air which is admitted into the lower end of unit 18 via stream 19, which preferably consists of ambient air. The rising air stream cools and solidifies the falling droplets of ammonium nitrate, to form solid spherical ammonium nitrate prills. The resulting air stream 20 removed from the upper end of unit 18 is now at an elevated temperature typically in the range of 40° C. to 80° C., and stream 20 will usually contain a minor proportion of entrained ammonium nitrate, either as liquid droplets or as discrete solid particles. In some cases stream 20 may be directly discharged to atmosphere via stream 21, however stream 20 is preferably recycled via stream 22 for further processing in accordance with the present invention, as will appear infra.

A solid ammonium nitrate prills stream 23 is removed from the bottom of unit 18, and is passed through one or a plurality of drying and cooling drums such as unit 24, in which the solid prills are further dried and cooled by contact with air which is admitted into unit 24 via stream 25. The air flowing through unit 24 cools and dries the prills, and also entrains a proportion of solid ammonium nitrate particles. The resulting air stream 26 discharged from unit 24 contains entrained solid particles of ammonium nitrate, and is further processed in accordance with the present invention, as will appear infra. Product solid ammonium nitrate prills stream 27 is discharged from unit 24 and passed to product utilization, as a fertilizer, a component of mixed fertilizer, or the like.

Returning to unit 4, stream 10 which consists mainly of evolved vapor in the form of steam, is passed into heat exchanger 28. The vapor stream 10 is at least partially condensed in unit 28, in heat exchange with a dilute ammonium nitrate solution as will appear infra. The resulting liquid condensate system 29 removed from unit 28 consists essentially of a very dilute aqueous ammonium nitrate solution of about 0.5% to 2% ammonium nitrate content by weight, together with residual vapor if present, which may contain ammonia. Stream 29 is passed into hold and phase separation tank 30, from which a vapor stream 31 is passed into gas scrubbing tower 32 below packed section 33. The gas-liquid contact section 33 may consist of a bed or beds of a suitable packing, such as spheres, saddles or rings, or may consist of bubble cap plates, sieve trays or the like, or may consist of a Venturi-type contactor. An air stream 34 containing ammonium nitrate and formed by combining streams 16 and 22 is also passed into unit 32 below section 33. The liquid phase from tank 30 passes via stream 35 into unit 32 above section 33, and flows downwards through section 33 countercurrent to the rising gas and vapors phase, thus scrubbing the gas phase and removing ammonium nitrate droplets or solid particles into the liquid phase, in accordance with the present invention. The scrubbed gases and vapors, now essentially devoid of ammonium nitrate and free ammonia, are discharged from unit 32 about section 33 via stream 36, which passes to atmospheric discharge via a stack or the like.

The scrubbing liquid phase is removed from the lower portion of unit 32 below section 33 as stream 37, which now consists of an aqueous ammonium nitrate solution of about 3% to about 8% ammonium nitrate content by weight. Stream 37 passes into scrubbing tower 38 above section 39. Unit 38 is generally similar in configuration to unit 32 and is provided with a gas-liquid contact section 39 which is similar in configuration and function to section 33 described supra. Air stream 26 laden with entrained solid ammonium nitrate particles is passed into unit 38 below section 39, and rises through section 39 countercurrent to the downflowing liquid phase which removes and dissolves the solid ammonium nitrate particles from the gas phase, in accordance with the present invention. The resulting scrubbed air, now essentially devoid of ammonium nitrate, is discharged to atmosphere from unit 38 above section 39 via stream 40. The scrubbed air stream 40 may contain a minor proportion of entrained liquid droplets of aqueous ammonium nitrate solution, however these liquid droplets consist of a very dilute solution as contrasted to the prior art practice in which stream 26 is scrubbed with concentrated ammonium nitrate solution to about 50% to 60% strength, with resulting entrainment of droplets of concentrated ammonium nitrate solution, resulting in air pollution.

The resulting scrubbing liquid phase discharged from unit 38 below section 39 via stream 41 now consists of an aqueous ammonium nitrate solution which typically contains in the range of about 5% to 15% ammonium nitrate content by weight. Stream 41 is passed into remelt dissolving tank 42, together with solid ammonium nitrate stream 43, which consists of oversize and/or undersize particles or lumps of ammonium nitrate, derived from processing and not conforming to product size or consistency specifications. Streams 41 and 43 are mixed in tank 42 which is provided with a suitable agitation or stirring means 44. Stream 43 is thereby dissolved into the aqueous liquid phase, and the resulting liquid stream 45 discharged from unit 42 consists of an aqueous liquid ammonium nitrate solution of intermediate strength, typically containing in the range of about 15% to 30% ammonium nitrate content by weight.

Stream 45 is now concentrated prior to recycle for falling film evaporation and prilling as described supra, to form further solid ammonium nitrate particles of product size specifications. Stream 45 is passed into the circulation leg 46 of remelt solution concentrator 47, which is preferably a vacuum remelt concentrator. The combined aqueous solution on leg 46, which is at an initial temperature typically in the range of 40° C. to 70° C., is circulated through indirect heat exchanger 28 and in heat exchange with stream 10, and the circulating remelt solution discharged from unit 28 via return leg 48 is at a temperature typically in the range of 60° C. to 90° C. Solution circulation member 48 discharges the warmed remelt solution back into unit 47, in which the warmed solution is subjected to vacuum evaporation for water removal. Solution heating means such as steam coils or the like, not shown, may also be provided in unit 47 to further heat the solution and aid in the evaporation of water. The resulting evolved water vapor stream, which may contain a minor proportion of liquid droplets, rises from unit 47 into the upper reflux section 49, which is provided with the baffles or sieve trays 50. Units 50 may alternatively consist of bubble cap trays, a packed section, or the like, similar to section 33 described supra. A reflux condensate liquid stream 51 consisting of essentially pure condensate water is passed into the upper portion of section 49, and flows downwards through and in contact with the rising vapor phase, thereby producing substantially complete removal from the vapor phase of droplets or the like containing ammonium nitrate. A substantially pure steam or water vapor stream 52 is removed from the upper portion of section 49. In addition, a concentrated aqueous ammonium nitrate solution formed in unit 47, and typically containing in the range of about 50% to 90% ammonium nitrate content by weight, is removed from unit 47 via stream 12 and recycled via tank 11 as described supra.

Stream 52 now extends to a source of vacuum or the like, and portions of stream 52 also flow to feed streams heating. Stream 52 divides into streams 53 and 54, which latter stream divides into streams 55 and 56. Stream 55 extends to a surface condenser or the like and a source of vacuum, such as a steam jet, which maintains a vacuum level of from about 0.1 kg./sq. cm. absolute pressure to about 0.8 kg./sq. cm. absolute pressure in the system including section 49 and unit 47. Stream 53 flows through heat exchanger 2 and in heat exchange with stream 1, and steam stream 53 is condensed in unit 2 to form condensate stream 57. Similarly, steam stream 56 flows through heat exchanger 7 and is condensed to form condensate stream 58. The condensate streams 57 and 58 pass into hold tank 59, from which pure liquid condensate water stream 60 is removed and divided with stream 51, which is recycled for reflux as described supra, and stream 61 which is discharged to waste or further utilized for steam production or the like.

Numerous alternatives within the scope of the present invention, besides those mentioned supra, will occur to those skilled in the art. The invention is generally applicable to the production of a solid chemical from a liquid solution by processing which includes vaporization of a liquid component and preparation of a solid by contact with a gas. With respect to ammonium nitrate production as described supra, the ranges of process variable such as temperature, pressure and solution concentrations constitute preferred embodiments of the invention for optimum utilization of the process concepts, and the invention may be practiced outside of these ranges in suitable instances. In addition, the preheating of streams 1 and/or 6 may be omitted in suitable instances. Unit 4 is preferably operated at elevated pressure, however an atmospheric pressure neutralizer or reactor of suitable configuration may be provided in some facilities. Similar considerations apply to unit 47, thus unit 47 is preferably operated under vacuum, however evaporative concentration of stream 45 under atmospheric or even under elevated pressure conditions above atmospheric pressure may be practiced in some cases. Stream 35 may alternatively pass directly to unit 38, with the bottoms liquid solution from unit 38 passing to unit 32 and the bottoms liquid solution from unit 32 passing to remelt tank 42 or directly to unit 47. A portion of stream 41 may alternatively pass directly to unit 47. In another alternative, stream 35 may be split with a portion passing to unit 32 and the balance passing to unit 38. In this case, both the liquid bottoms solutions from units 32 and 38 would pass either to unit 42 or directly to unit 47. The ammonium nitrate processing units 14, 18 and 24 may alternatively be replaced by functionally equivalent devices and/or apparatus known to the art.

An example of an industrial application of the procedural concepts of the present invention to a commercial ammonium nitrate production facility will now be described.

EXAMPLE

The present invention was applied in the design of a commercial-scale ammonium nitrate facility. Following is data relative to flow rates of the principal process streams, expressed in kilograms per hour of process stream components.

FLOW RATE OF STREAM COMPONENT, KG./HR.

| Stream No. | Ammonia | Nitric acid | Water or steam | Ammonium nitrate | Air |
|---|---|---|---|---|---|
| 1 | 11,450 | | | | |
| 6 | | 41,600 | 30,200 | | |
| 9 | | | 10,840 | 52,970 | |
| 10 | | 58 | 19,360 | 30 | |
| 12 | | | 770 | 3,750 | |
| 16 | | | 6,276 | 20 | 12,000 |
| 22 | | | 5,750 | 25 | 230,000 |
| 26 | | | 4,700 | 1,246 | 225,000 |
| 36 | | | 14,300 | 0.01 | 242,000 |
| 37 | | | 17,076 | 75 | |
| 40 | | | 7,000 | 1 | 225,000 |
| 41 | | | 14,776 | 1,245 | |
| 45 | | | 14,776 | 3,750 | |
| 51 | | | 8,420 | | |
| 52 | | | 23,300 | | |
| 61 | | | 14,980 | | |

The net flow of stream 13 to unit 14 was 8450 water and 41251 ammonium nitrate, with the balance from tank 11 consisting of 3160 water and 15469 ammonium nitrate passing to solutions storage.

We claim:

1. In a process for the production of solid ammonium nitrate in which feed streams of ammonia and aqueous nitric acid are reacted to form a concentrated aqueous ammonium nitrate solution and evolve a first vapor stream containing steam and entrained liquid droplets of aqueous ammonium nitrate solution, and said concentrated aqueous ammonium nitrate solution is processed to produce product solid ammonium nitrate by contact with air, whereby an air stream containing entrained ammonium nitrate is produced, the improvement which comprises (a) cooling said first vapor stream by indirect heat exchange with an aqueous solution comprising dilute aqueous ammonium nitrate solution, said aqueous solution being thereby heated and concentrated by evolution of a second vapor stream under vacuum to produce a concentrated recycle ammonium nitrate solution, said first vapor stream being at least partially condensed to produce an aqueous liquid condensate containing ammonium nitrate, and (b) scrubbing said air stream with said aqueous liquid condensate, whereby entrained ammonium nitrate is removed from said air stream and dissolved in said aqueous liquid condensate, and thereby producing said dilute aqueous ammonium nitrate solution.

2. The process of claim 1, in which said concentrated recycle ammonium nitrate solution is added to the concentrated aqueous ammonium nitrate solution produced by said reaction of ammonia and nitric acid feed stream, prior to the processing of said solution to produce product solid ammonium nitrate.

3. The process of claim 1, in which said concentrated aqueous ammonium nitrate solution is dispersed as a thin falling film on a substantially vertically oriented surface, said surface being indirectly heated, air is passed in contact with said thin falling film of aqueous ammonium nitrate solution, whereby a substantially anhydrous ammonium nitrate melt is produced, and the resulting air stream containing entrained ammonium nitrate is scrubbed with said aqueous liquid condensate.

4. The process of claim 1, in which water is removed from said concentrated aqueous ammonium nitrate solution, whereby a substantially anhydrous ammonium nitrate melt is produced, said melt is dispersed in air, whereby solid ammonium nitrate particles are produced, and the resulting air stream containing entrained ammonium nitrate is scrubbed with said aqueous liquid condensate.

5. The process of claim 1, in which said concentrated aqueous ammonium nitrate solution is processed to produce solid ammonium nitrate particles, said solid ammonium nitrate particles are contacted with air, and the resulting air stream containing entrained ammonium nitrate is scrubbed with said aqueous liquid condensate.

6. The process of claim 5, in which said solid ammonium nitrate particles initially contain residual moisture, and said air is preheated above ambient temperature prior to contact with said solid ammonium nitrate particles, whereby said particles are dried by contact with the preheated air.

References Cited

UNITED STATES PATENTS

| | | | |
|---|---|---|---|
| 1,471,926 | 10/1923 | Schafer | 55—70 X |
| 1,962,185 | 6/1934 | Fauser | 23—119 |
| 2,034,864 | 3/1936 | Handforth | 23—103 |
| 3,214,260 | 10/1965 | Yasumaro et al. | 23—107 |
| 3,499,731 | 3/1970 | Sackett, Sr. | 23—107 X |
| 2,089,957 | 8/1937 | Harris et al. | 23—103 |

EARL C. THOMAS, Primary Examiner

G. O. PETERS, Assistant Examiner